United States Patent [19]

Jakobsen et al.

[11] Patent Number: 4,511,322

[45] Date of Patent: Apr. 16, 1985

[54] APPARATUS FOR THE MANUFACTURE OF A CUP-LIKE ARTICLE FROM POLYETHYLENE TEREPHTHALATE OR SIMILAR MATERIAL

[75] Inventors: Kjell M. Jakobsen, Skanor; Clees T. Nilsson, Loddekopinge, both of Sweden

[73] Assignee: PLM Aktiebolag, Malmo, Sweden

[21] Appl. No.: 457,055

[22] Filed: Jan. 10, 1983

Related U.S. Application Data

[62] Division of Ser. No. 154,890, May 30, 1980, Pat. No. 4,381,279.

[51] Int. Cl.$^3$ .................. B29C 17/03; B29C 17/04
[52] U.S. Cl. .................. 425/384; 425/387.1; 425/400; 425/403; 425/DIG. 48
[58] Field of Search .................. 425/384, 387.1, 400, 425/403, DIG. 48; 264/522, 550, 551, 292, 294, 296, 327

[56] References Cited

U.S. PATENT DOCUMENTS

| | | | |
|---|---|---|---|
| 3,184,524 | 5/1965 | Whiteford | 264/550 |
| 3,757,718 | 9/1973 | Johnson | 264/292 X |
| 3,859,028 | 1/1975 | van der Gaug et al. | 425/403 |
| 3,949,046 | 4/1976 | Procter | 264/550 X |
| 4,005,164 | 1/1977 | Procter | 264/550 |

Primary Examiner—Jan Silbaugh
Attorney, Agent, or Firm—Roberts, Spiecens & Cohen

[57] ABSTRACT

Apparatus for the manufacture of articles from a thermoplastic of polyester or polyamide type, preferably of polyethylene terephthalate, the element consisting of an edge part which surrounds a body in an arrangement in which the latter is sunk relative to the edge part. The element is formed from a blank of mainly amorphous material or from a material having a crystallinity of less than 10%. The blank consists, for example, of a flat plate, a blank shell or the like. The body or parts thereof are shaped by stretching the blank until that material flows which is located within the material sections of the blank, which form the edge part in the element, the material stretched up to flowing in the body assuming a crystallinity of between 10% and 25%, while the crystallinity in the material in the edge part and in the unstretched parts retains its original value of less than 10%. At least the body of the element is expanded against warm mould walls until the final shape of the particular article is obtained. Optionally, the expansion is preceded by a number of drawing steps with an axial elongation of the body coupled with a simultaneous reduction in its dimensions at right angles thereto.

8 Claims, 22 Drawing Figures

APPARATUS FOR THE MANUFACTURE OF A CUP-LIKE ARTICLE FROM POLYETHYLENE TEREPHTHALATE OR SIMILAR MATERIAL

CROSS-RELATED APPLICATION

This application is a division of Ser. No. 154,890 filed May 30, 1980, now U.S. Pat. No. 4,381,279.

BACKGROUND OF THE INVENTION

The invention relates to the manufacture of articles from a thermoplastic of polyester or polyamide type, preferably of polyethylene terephthalate, the articles being formed from an element which consists of an edge part which surrounds a body in an arrangement in which the latter is sunk relative to the edge part. The element is formed from a blank of mainly amorphous material or from a material having a crystallinity of less than 10%. The blank consists, for example, of a flat plate, a blank shell or the like. The body or parts thereof are shaped by stretching the blank until that material flows which is located within the material sections of the blank, which form the edge part in the element, the material stretched up to flowing in the body assuming a crystallinity of between 10% and 25%, whilst the crystallinity in the material in the edge part and in the unstretched parts retains its original value of less than 10%. The edge part is severed from the body, the latter being elongated in the axial direction by a number of drawing steps, whilst the dimensions of the body at right angles thereto are reduced at the same time. The body of the element of the drawn part is reshaped by a blow-moulding process to give the article.

In the manufacture of products from thermoplastics, the starting material is in most cases a virtually flat blank. Either an end product is formed here substantially in one deformation step, or a premoulding is formed for later reshaping to give the end product. The shaping of the blank is effected, according to methods known at present, either by the blow-moulding process or by the thermo-forming process. In the blow-moulding process, thick sections are as a rule thicker in the bottom. In the thermo-forming process, either so-called negative thermo-forming or so-called positive thermo-forming is used. In the negative thermo-forming process, a thin bottom is obtained, whilst a thick bottom is obtained in the positive thermo-forming process.

In negative thermo-forming, a warm sheet or a warm film is placed over cavities, after which the material of the film or the sheet is pressed and sucked into the cavities by external pressure and internal reduced pressure. This has the result that the material is stretched and becomes thin, when it is sucked into the particular cavities. If the cavity is a cup, a thin stretched bottom and a wall thickness increasing in the direction of the edge of the cup are obtained.

In positive thermo-forming the cup mould forms a projecting body and the material of the film or sheet is pressed and sucked over this projecting body. This has the result that the material on the upper part of the projecting body, that is to say the bottom of the cup, remains thick and essentially unstretched, whilst the thickness of the material decreases towards the edge of the cup.

To obtain an adequate material thickness in the bottom part of the cup in negative thermo-forming, a sufficient thickness in the starting material must be chosen. To obtain an adequate thickness in the edge zone of the cup by positive thermo-forming, which is necessary for stability of the cup, a sufficient thickness of starting material must likewise be chosen. In negative thermo-forming, the material zones between the shaped cups remain uninfluenced and are subsequently severed, after the manufacture of the actual cups. In positive thermo-forming, the material between the cups is drawn into recesses and severed from the cups formed. In positive thermo-forming, cup bottoms are thus obtained which have substantially the same thickness as the starting material. Both forming processes require an unnecessarily high consumption of material, which is of economic importance in the mass production of articles.

SUMMARY OF THE INVENTION

An object of the present invention is to provide apparatus which eliminates certain disadvantages connected with the technology hitherto known.

The invention is suitable preferably for the manufacture of articles from thermoplastics of the polyester or polyamide type. Examples of such materials are polyethylene terephthalate, polyhexamethylene-adipamide, polycaprolactam, polyhexamethylene-sebacamide, polyethylene 2,6- and 1,5-naphthalate, polytetramethylene 1,2-dihydroxybenzoate and copolymers of ethylene terephthalate, ethylene isophthalate and similar polymers. The description of the invention below relates mainly to polyethylene terephthalate, called PET in the further text, but the invention is not restricted exclusively to the use of either this material or other materials already mentioned; instead, it is also suitable for many other thermoplastics.

For a better understanding of the existing problem and of the invention, several characteristic properties of the polyester polyethylene terephthalate are described below. From the literature, for example Properties of Polymers, by D. W. van Krevelen, Elsevier Scientific Publishing Company, 1976, it is known that the properties of the material change when amorphous polyethylene terephthalate is oriented. Some of these changes are shown in the diagrams, FIGS. 14.3 and 14.4 on pages 317 and 319 in the book "Properties of Polymers". The symbols used in the discussion below correspond to the symbols in the said book.

PET, like many other thermoplastics, can be oriented by stretching the material. Normally this stretching takes place at a temperature above the glass transition temperature Tg of the material. The strength properties of the material are improved by orienting. The literature shows that, in the case of the thermoplastic PET, an increase in the stretching ratio $\Lambda$, that is to say the ratio of the length of the stretched material and the length of the unstretched material, also leads to an increase in the improvement of the material properties. When the stretching ratio $\Lambda$ is increased from about 2 to a little more than 3, particularly large changes in the material properties are obtained. The strength in the direction of orientation is here markedly improved, whilst at the same time the density $\rho$ and likewise the crystallinity Xc rises and the glass transition temperature Tg is raised. It can be seen from the diagram on page 317 that, after stretching, with $\Lambda$ assuming the value of 3.1, the material withstands a force per unit area, which corresponds to $\sigma = 10$, coupled with a very small elongation, whilst the elongation at $\Lambda = 2.8$ is substantially larger. In the further test, the term "step" is sometimes used to designate orienting which is obtained by stretching, or a reduction in thickness by at least about 3 times, and which leads to the marked improvements of the material properties, indicated above.

The diagrams quoted above show changes which are obtained on mono-axial orientation of the material. In biaxial orientation, similar effects are obtained in both directions of orientation. Orientation is carried out as a rule by successive stretchings.

Improved material properties, corresponding to those which are obtained by the "step" defined above, are also obtained if an amorphous material is stretched until it flows and, before flowing, the material is at a temperature which is below the glass transition temperature Tg. In a rod being drawn, a reduction of the diameter of about 3 times results in the flow zone. On drawing, the flow zone is continuously displaced into the amorphous material, whilst at the same time the material, which has already undergone the state of flowing, absorbs the tensile forces of the test rod without an additional permanent stretching.

According to the invention, an element is produced which consists of an edge part and a cup part, starting from a substantially flat blank of amorphous material or having a crystallinity of less than 10%. The material in annular sections in the blank is transformed into the state of flow by a drawing process. The cup part is formed in this way. In certain applications, the ratio between the radial and the axial expansion of the cup is such that production of the beaker in a single drawing step is not possible. According to the invention, the desired ratios are obtained by a number of redrawing steps of the cup, the diameter of the cup being reduced in each redrawing step, whilst the thickness of the material remains more or less unchanged.

The cup part of the element of the drawn cup is reshaped by a blow-moulding process to give the article.

According to the invention, an element is obtained which consists of an edge part and a cup part, the material preferably being of more or less uniform thickness and orientation in the entire bottom of the cup part (cup). In a certain embodiment of the invention, the material in the bottom part of the cup moreover consists completely or partially of material of the same thickness as that of the material of the wall. The remaining sections of material have the thickness and material properties of the material. In certain applications, the bottom is more or less completely flat, whilst in other applications the bottom consists of parts which are axially displaced relative to the axis of the cup. In this case, in certain embodiments, annular edge sections are formed adjoining the lower edge of the wall, whilst in other embodiments central bottom sections are displaced further away from the upper opening edge of the element.

The element consists of an edge part which surrounds a body which is sunk relative to the edge part. The material in the edge part is mainly amorphous or has a crystallinity of less than 10%. The body has a wall part and a bottom part. The wall part consists of material which has been drawn at a temperature below the glass transition temperature Tg, until flow sets in, and in which the crystallinity is between 10% and 25%. In the basic design of the element, the bottom consists of mainly amorphous material or of material having a crystallinity of less than 10%. In embodiments of the invention, the bottom consists, as desired, of material which has been drawn at a temperature below the glass transition temperature Tg and at a crystallinity between 10% and 25%, until flow sets in, that is to say of a material having properties which mainly are identical to the material properties of the wall part of the element, or of material sections which have been drawn until flow sets in and which alternate with material sections of mainly amorphous material or material having a crystallinity of less than 10%. In certain embodiments, the material zones already mentioned are displaced in the axial direction relative to the lower edge of the wall part.

During the production of an element, a mainly flat blank of thermoplastic, having a crystallinity of less than 10%, is clamped in at a temperature below the glass transition temperature Tg between counter-holders, so that a zone is formed which is completely surrounded by the clamped-in material sections. A press device the contact surface of which is smaller than the surface area of the zone, is applied against this zone. Thus, a closed strip-like material zone is formed between the clamped-in material sections of the blank and that part of the zone which is in contact with the press device. Subsequently, a drive mechanism shifts the press device relative to the counter-holder, while the press device remains in contact with the zone. The material in the strip-like zone is thus stretched in such a way that flow of the material occurs, the material being monoaxially oriented, whilst at the same time the thickness of the material is reduced by about 3 times in the case of PET. The wall part of the element is formed during the stretching process.

Since the circumference of the contact surface of the press device is smaller than the inner circumference of the clamping devices, the material which adjoins the edge of the press device is subjected to the greatest stress, for which reason the flow of the material normally starts at this point. The effect thus resulting is further reinforced by the fact that the transition from the contact surface of the press device to the side walls of the press device is made relatively sharp-edged. When flow has set in, the zone of flow of the material is gradually shifted in the direction of the clamping devices. In certain application examples, the press step is interrupted when the flow zone has reached the press devices. In other application examples, the press step continues, renewed flowing of the material taking place adjoining the edges of the press device and being displaced from these zones towards the center of the material. When all the material which is in contact with the contact surface of the press device has undergone flow, that material between the clamping devices which is located next to the inner circumference of the clamping devices is utilized for a further drawing step in certain application examples. To make this possible, a somewhat elevated temperature in this material is normally required. The starting temperature, however, is still below the glass transition temperature Tg.

In certain application examples, accelerated cooling of the drawn material is necessary. In this case, the press device is preferably provided with a cooling device which is arranged in such a way that the zones of the material, which flow during drawing of the material, are in contact with the cooling device.

In certain applications, the flow of the material is caused to start adjoining the clamping devices. This is accomplished by providing the clamping devices with heating devices which raise the temperature of those material sections where flow is to start. The temperature in the material, however, is still below the glass transition temperature Tg of the material. When flow has set in, this continues in the direction of the contact surface of the press device and, in some cases which may occur, it continues past the transition from the side walls to the contact surface of the press device. To ensure that the clamping devices retain the blank in the future edge sections of the element, the clamping devices are as a rule provided with cooling devices.

The concept of the invention also comprises the possibility that, by a number of drawing steps which are arranged one after the other, both in the wall part and in the bottom part of the body, material sections are obtained which alternately consist of material sections which have been drawn until flow sets in and have in this way been given a reduced wall thickness, and undrawn material sections which have retained their wall thickness. In material sections located in the bottom part of the body, a displacement of the material in the axial direction of the body also takes place in certain application examples in conjunction with the drawing step.

The edge part is removed from the element formed and the element is reshaped by a number of drawing steps. These drawing steps take place at a temperature below the glass transition temperature Tg and effect a reduction of the diameter of the cup, whilst the length of the body is extended at the same time in the axial direction. The drawing step effects exclusively a redistribution of the material without flow setting in.

The cup formed after the end of the drawing step has an opening at one end, whilst it has a bottom part at the other end. Depending on the manner in which the element has been shaped, the bottom part consists wholly or partially of amorphous material or of unoriented material. In the first-mentioned case, the bottom part thus retains the thickness of the starting material in the amorphous zone or in the amorphous zones. The amorphous material is suitable for use as a fixing material for welding additional parts to the cup. This requirement will be present, for example, when the cup is used as a container and the bottom part of the cup simultaneously represents the bottom part of the container. In this case, it is advantageous to weld an external foot to the container. The cup shaped in the manner described possesses an opening part which, if appropriate after reworking, is preferably expanded in such a way that a beaded edge results, the stability of the beaded edge being increased by heating up to the maximum crystallisation temperature of the material. The beaded edge is thus outstandingly suitable for fitting, for example, a loose lid of a suitable material, for example metal, by crimping.

In another application example, the drawing step at the cup is interrupted so that parts of the cup have a reduced diameter compared with the initial diameter. By removing the bottom from this part of smaller diameter, expanding the edge formed and stabilising the opening which has been formed in the manner described in the preceding section, a mouth part is obtained which is suitable for fitting, for example, a closure or a crown cap. The other still open part of the cup is closed, for example, by an end disc, in a manner similar to that already described.

In the blow-moulding process, the starting point is either a cup which has been severed in the normal way from the edge part of the element, or from a newly drawn cup. By blow-moulding against warm mould walls, the cup, the material of which is at a temperature above the glass transition temperature Tg, is reshaped in such a way that it has exactly the form of the intended end product. In certain applications, a warm blowing mandrel is used in order to prevent excessive cooling of the material during the blow-moulding step.

It can be seen from what has been said that the combination of drawing, until flow sets in to obtain an element, redrawing of the cup of the element formed and a blow-moulding step offers many optional possibilities for the shaping of different types of articles.

An article produced in the manner described above is thus not only suitable for use as a container, but many applications are possible.

BRIEF DESCRIPTION OF THE DRAWINGS

The invention will be described in detail with reference to the drawings, wherein.

DETAILED DESCRIPTION

Figure 1:
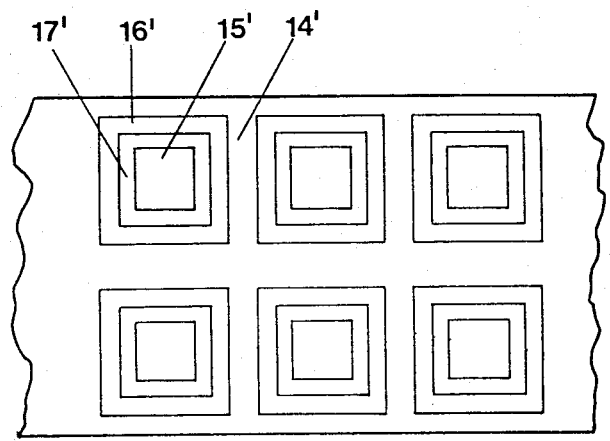
FIGS. 1–2 show optional embodiments of bands suitable for reshaping.
Figure 2:
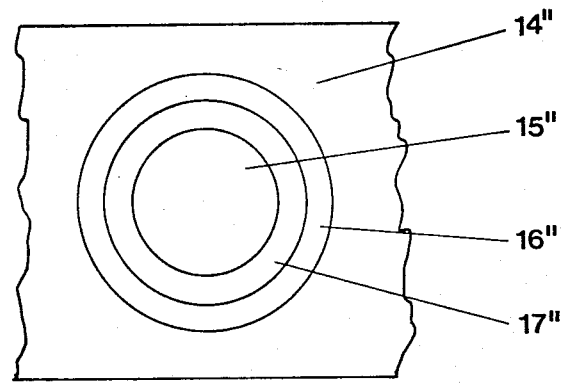

FIGS. 1–2 show a band or a blank 14', 14'' of thermoplastic, the bands or blanks being seen from above. In the figures, annular material zones 16', 16'' or 17', 17'' are represented. Moreover, a material zone 15', 15'' is indicated which is surrounded by the original annular material zone 17', 17''. The material zone 16 marks that zone which, on drawing of the blank, is clamped in between the clamping devices 3a–b (see FIG. 4). The material zone 15 marks that zone which, on drawing of the blank, is in contact with the press face of the press device 20 (see FIG. 4). The material zone 17 marks that zone which, on drawing of the blank, is brought into the state of flow.

Figure 3:
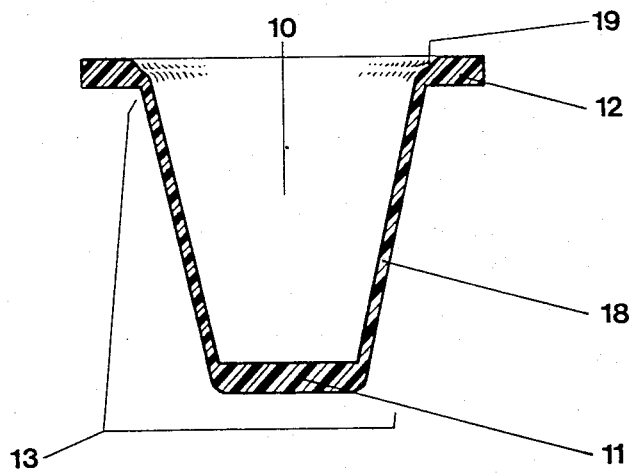
FIG. 3 shows an element having a bottom part of the body, consisting mainly of amorphous material.

An element 10 consisting of an edge part 12 of the body 13 is seen in FIG. 3. The body in turn consists of a wall part 18 and a bottom part 11. In the figure, the wall part consists of drawn material of reduced thickness compared with the thickness of the starting material. The bottom part 11 consists of material which, while retaining its material properties, has been displaced in the axial direction of the body. Moreover, a zone 19 is marked in which material belonging to the edge part 12 had been transformed into the state of flow.

Figure 4:
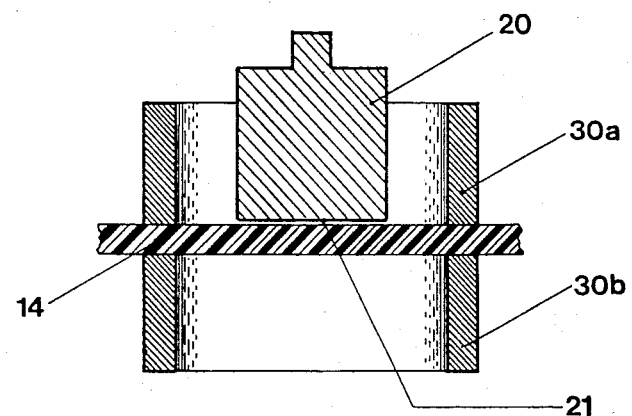
FIGS. 4–10 show the principles of devices for drawing of the element.
Figure 5:
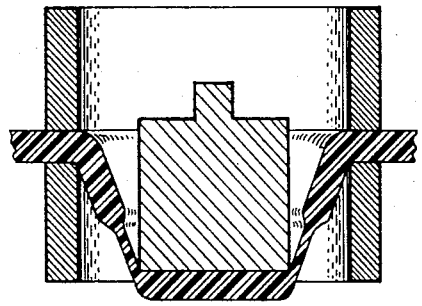
Figure 6:
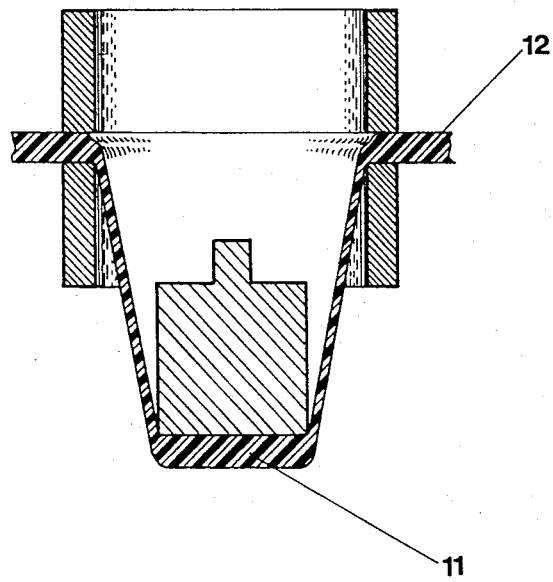
Figure 7:
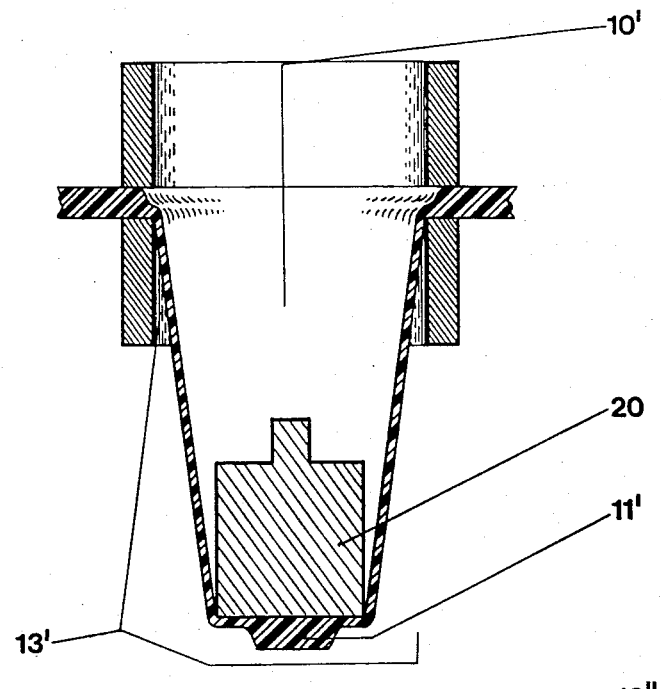
Figure 8:
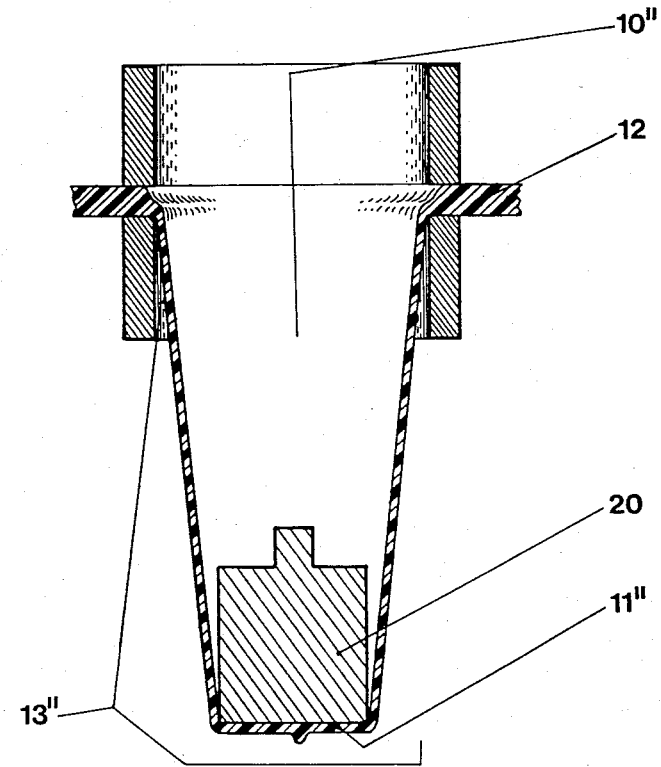

In FIGS. 4–8, a number of clamping devices 30a, 30b which fix the blank 14 can be seen. A press device 20 having a press face 21 is located between the clamping devices 30. In FIG. 4, the press device is in a position in which the press face 21 is located directly next to the upper surface of the blank 14. In FIG. 5, the press device was shifted downwards, flow of the material having started from a transition zone at which the original thickness of the blank is reduced to the drawn thickness of the element. It is seen that the drawing takes place between the outer surface of the press element and the inner surface of the clamping devices without contact of the drawn material with these surfaces whereby a so-called free drawing takes place. In FIG. 6, the press device has been shifted to such an extent that an element according to FIG. 3 has been formed. In FIG. 7, the press device was yet further shifted, further flow of the material having taken place. An element 10' has thus been formed, the body 13' of which has a bottom part 11, the central sections of which consist of amorphous undrawn material which is surrounded by drawn oriented material in which flow has taken place. Finally, in FIG. 8, the press device 20 has been shifted to such an extent that virtually the entire material in the bottom part 11' of the body 13" has undergone flow. An element 10' has thus been formed in which both the wall part and the bottom part of the body have a reduced wall thickness because the material has been in the state of flow and has at the same time been oriented.

Figure 10:
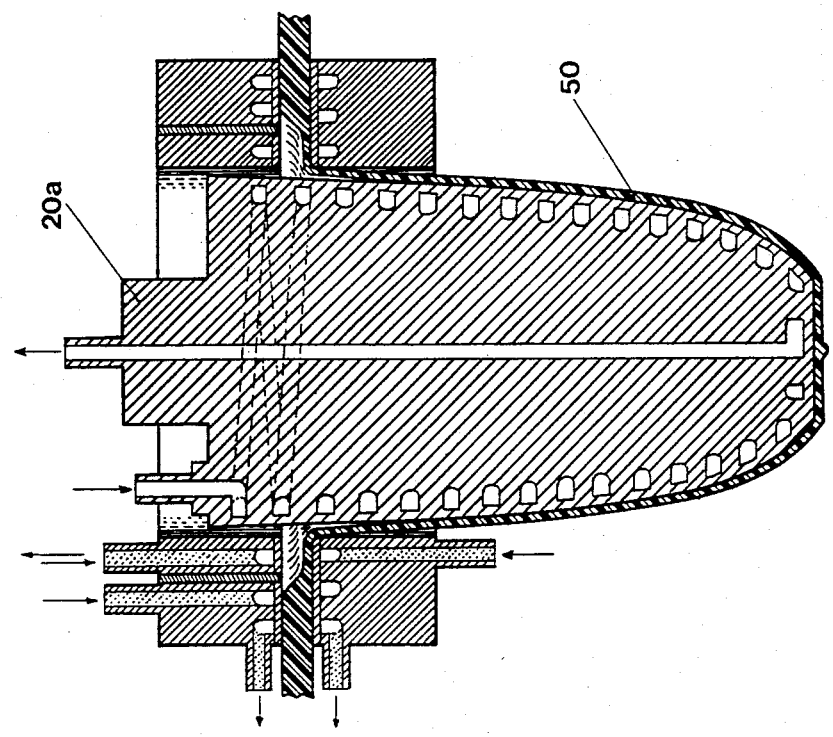
Figure 9:
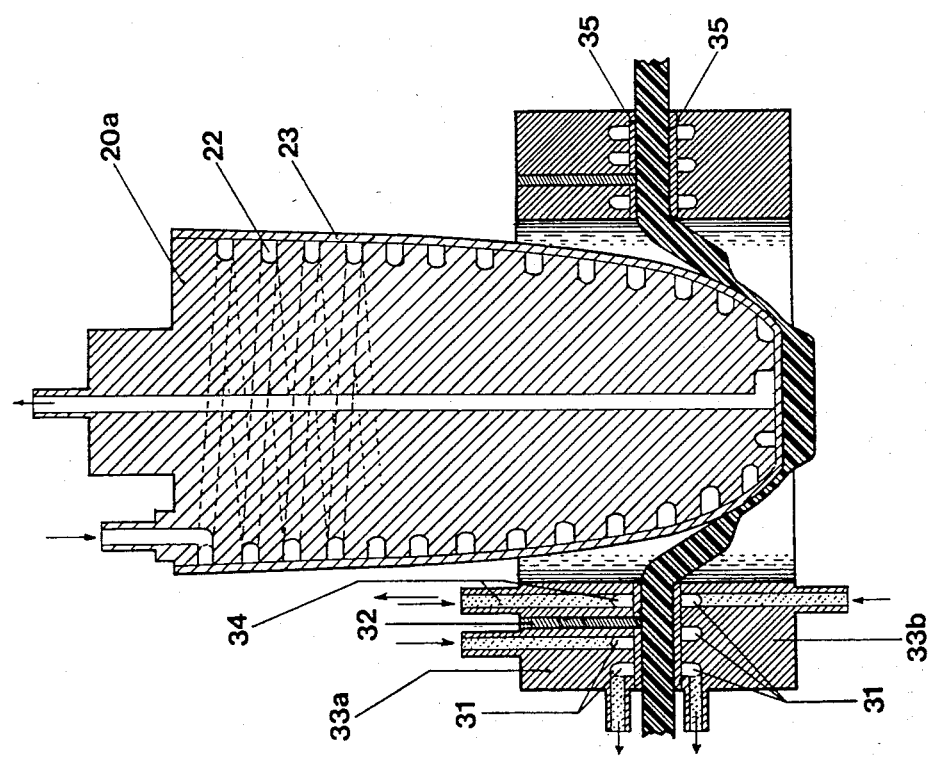

In FIGS. 9-10, an optional embodiment of the clamping devices 33a-b is represented, which are provided with cooling channels 31 and heating channels 34. In the figures, only the feedline for the heating channels is shown, whilst the discharge line for the heating channels is located behind the feedline in the figures and is indicated by the upward-pointing arrow. The cooling channels, like the heating channels, are covered by plate-like covers 35, the other surface of which at the same time represents the contact surface of the clamping devices for clamping the blank. An insulation 32 separates the cooled zone of the clamping devices from the heated zone. In certain applications, the heating channels are used as the cooling channels in the same way.

Furthermore, the figures show an optional embodiment of a press device 20a which also has cooling channels 22. The cooling channels are covered by a cooling jacket 23 which at the same time represents the outer contact surface of the press device opposite the material during the process of drawing the latter. FIG. 9 shows a position of the press device, which corresponds to the position shown in FIG. 5, and FIG. 10 shows a position of the press device, which corresponds to the position in FIG. 8. The press device is constructed with a face of rotationally symmetrical curvature, which is shaped in such a way that, on drawing within the flow range, the material is always in contact with the cooling jacket, whilst that material which has not yet been in the state of flow is not in contact at any point with any device in the zone between the press device and the clamping devices.

Heating of the material with the aid of the heating channels 35 has the purpose of increasing the readiness of the material to flow. Heating is limited, however, in such a way that the temperature of the material is always lower than the glass transition temperature Tg. Heating makes it possible to allow the drawing step of the material to continue a little into the zone between the jaws of the clamping devices, as shown in FIG. 10. Another optional application, where the increased readiness of the material to flow is exploited, is obtained when, during the drawing step, the zone of initial flow of the material is directed to the zone next to the inner edges of the clamping devices. After flow has taken place, the flow zone is gradually displaced in the direction away from the clamping devices towards the bottom of the press device, as the press device gradually shifts downwards as in the figures.

The result of this is that flow always propagates in the same direction, and a new start of flow is avoided, such as takes place when the embodiment of the invention shown in FIGS. 4–8 is used.

Figure 11:
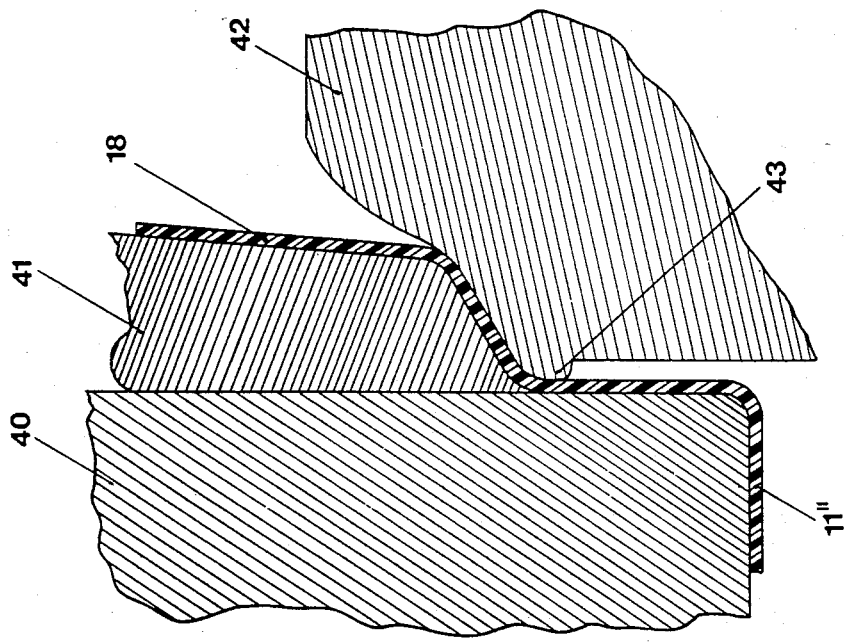
FIG. 11 shows a part of a device for redrawing of the cup of the element.

FIG. 11 shows a device for redrawing the element formed before. In the figure which shows only a part of the device, a press plunger 40, a counterholder ring 41, a clamping ring 42 and a wall part in the element are seen, the wall part being in the process of shaping. Moreover, the bottom 11" in the body 13 of the element is seen. The clamping ring 42 is provided with a calibration device 43 which determines the thickness of the material, drawn anew, in the wall part 18.

Figure 14:
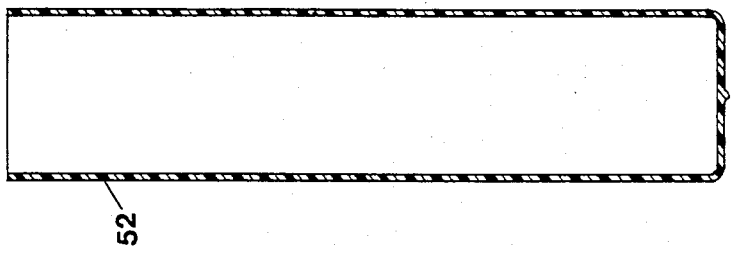
FIG. 14 shows the cup of the element after complete redrawing.
Figure 13:
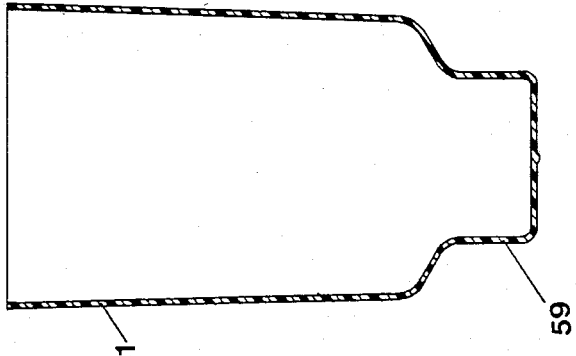
FIG. 13 shows the cup of the element after partial redrawing.
Figure 12:
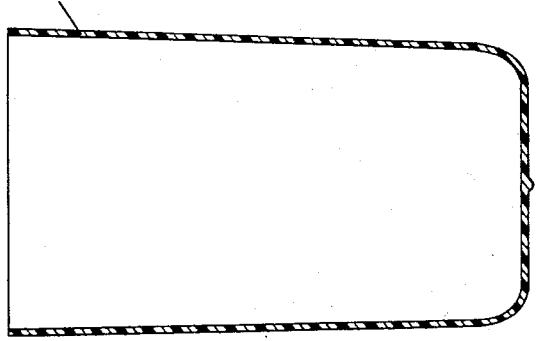
FIG. 12 shows the cup of the element before redrawing.

FIG. 12 shows an element body 50 which has been formed by means of the press device 20a according to FIG. 9 and in which the edge part of the element has been produced from the body. In FIG. 13, the shaping process of the body 50 was initiated with the aid of a device shown in FIG. 11. The shaping process has progressed to such an extent that a mainly cylindrical larger part, having the same diameter as the body 50, and a shorter part 59 have been formed. In FIG. 14, the shaping process has been completed, a mainly cylindrical body 52 of the same diameter as in the shorter part in FIG. 13 having been formed.

Figure 15:
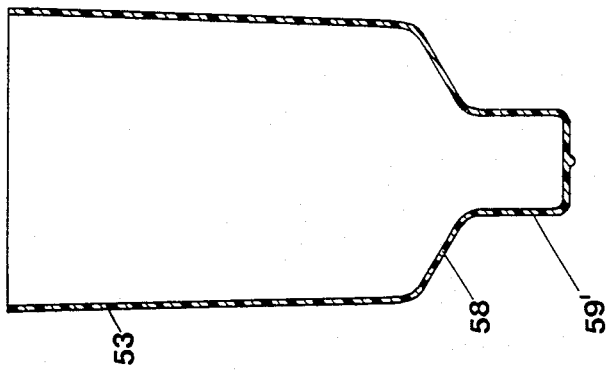
FIG. 15 shows the cup of the element, having the part of the cup, which was partially redrawn, according to FIG. 13, after renewed redrawing.

FIG. 15 shows a body 53, the shorter part 59 of which has been reshaped with the aid of a device shown in FIG. 11 for the purpose of further reducing the diameter of the shorter part 59'. There is a transition 58 between the shorter cylindrical part 59' and the larger part of the body 53.

Figure 16:
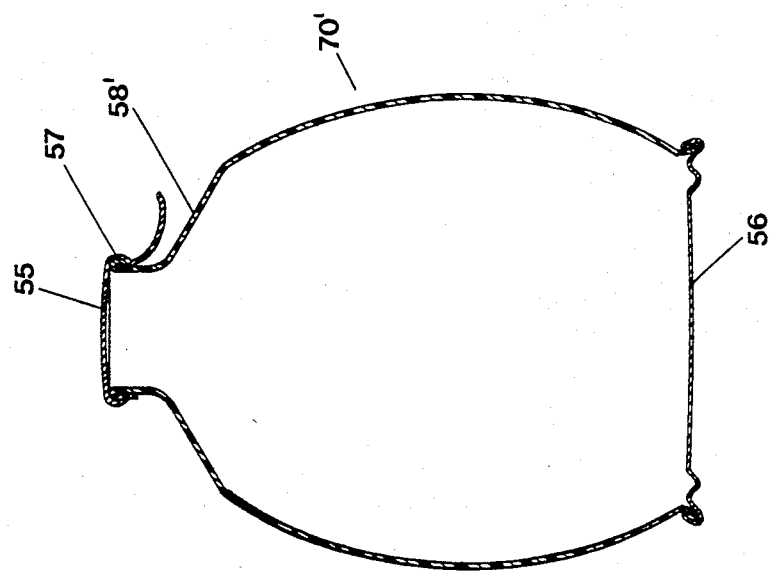
FIG. 16 shows a container produced from a cup according to FIG. 15, FIGS. 17–19 show the counterparts to FIGS. 12–14, the bottom part of the cup having sections of amorphous material

FIG. 16 shows a bottle-like container 70' produced from a body 53 according to FIG. 15. The bottom part of the shorter part 59' has been severed and replaced by a closure 55, for example a cap. The mouth edges formed on severing the bottom part were expanded and beaded, after which the material in the beaded material zones has preferably been given an increased crystallinity as a result of heating the material up to the crystallization temperature. This gives additional strength at the mouth edge so that the latter is well suited for closing the container, for example by means of a cap or a crown cork. The transition, already mentioned, between the shorter part and the larger part of the body now forms a bottle neck 58'. The figure also shows how an end disc 56 is fixed at the other end of the container 70', after the container has been filled. As a result of expanding, beading and heating of the material, material sections are here also obtained which are suitable, for example, for fitting an end disc by crimping, in order to close the container.

Figure 19:
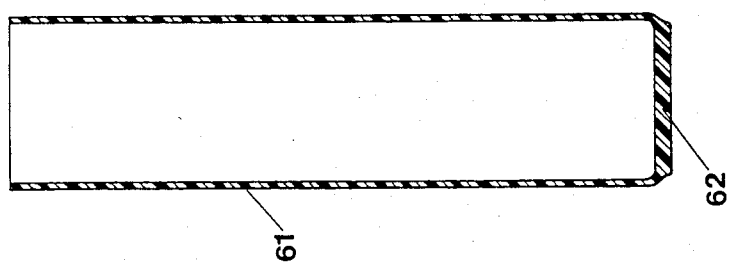
Figure 18:
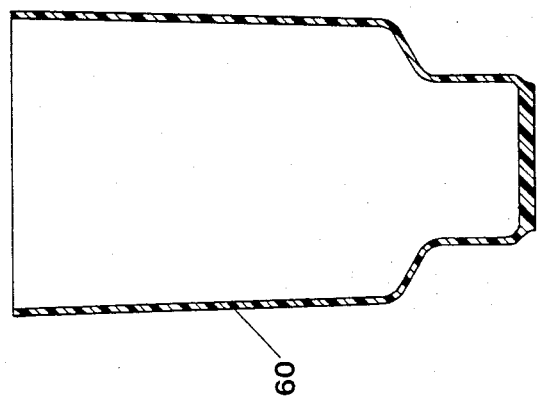
Figure 17:
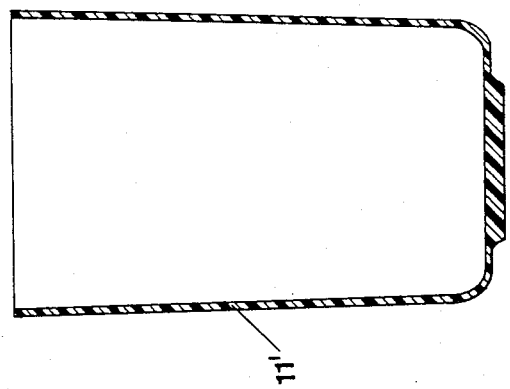

FIGS. 17-19 show counterparts to FIGS. 12-14. The figures show how an element body, formed from the body 11' according to FIG. 7, is subjected to an axial lengthening, with simultaneous reduction in the diameter of the body, and forms an almost completely cylindrical body 61, the bottom part of this body consisting of a material section 62 of mainly amorphous material. During the shaping process, an intermediate form of the body results, which is marked 60 in FIG. 18.

In the embodiment of the invention in which a body is formed which comprises an amorphous bottom section, a material zone is also obtained which is suitable as a fixing material for welding on additional parts to the body. By rendering the material crystalline, a zone of extreme dimensional stability is obtained, whereby it becomes possible to use the container for storing liquids under pressure, for example beverages to which carbonic acid has been added, without a risk of deforming the bottom part. The concept of the invention also comprises the replacement of the plane embodiment of the bottom part by a convex or concave face, depending on the particular wished which apply corresponding to the individual applications.

Figure 22:
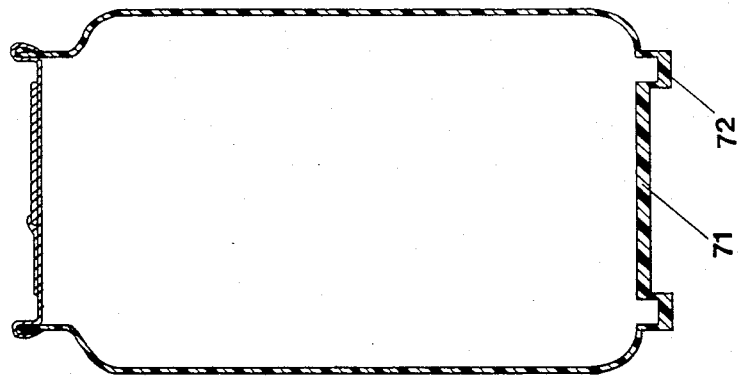
FIGS. 20–22 show optional embodiments of blow-moulded articles.
Figure 21:
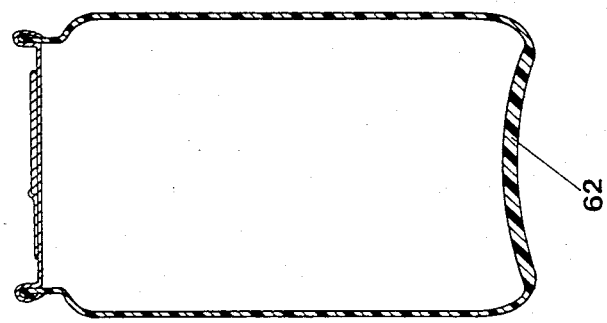
Figure 20:
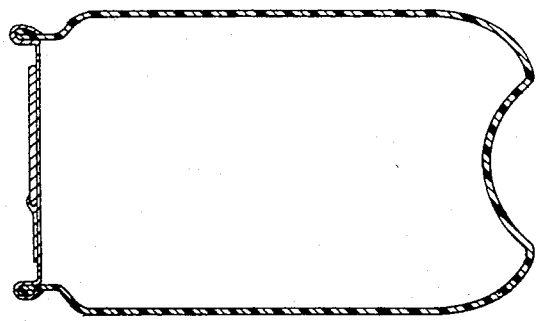

FIGS. 20-22 show optional embodiments of blow-moulded containers. All the containers are closed by end discs in the manner already described in connection with FIG. 16. Of course, this combination of a blow-moulded container and an end disc is to be regarded only as an example of the possibilities available for closure.

FIG. 20 shows an embodiment in which all the material in the blow-moulded container consists of material previously drawn. The container is formed from a body part either according to FIG. 12 or according to FIG. 14.

FIG. 21 shows an embodiment of a blow-moulded container which has been formed from a body part according to FIG. 17 or FIG. 19. On blow-moulding, the amorphous material zone 22 remained in the amorphous state without change, and it represents a thicker section in the bottom part of the container. In certain embodiments, this section is heated up to the crystallisation temperature of the material in order to form a bottom section which is particularly suitable for withstanding deformation forces, for example, forces due to an internal pressure in the container. The amorphous material is also suitable for the purpose of welding additional plastic parts thereto.

FIG. 22 shows an embodiment of a blow-moulded container which has been formed from a body part, the bottom of the body part consisting alternately of material sections, which have been drawn until flow sets in, and of those material sections which have retained their original thickness. In this way, a simple amorphous material section 21 has been formed which is surrounded by an annular amorphous section 72 which is located below the central section. The central section and the annular section are connected by material which has been drawn until flow sets in. The annular material section thus forms standing surfaces for the container. The parts forming the shell of the container are as a rule shaped from redrawn material. At least in the cases where the container has a relatively large axial dimension, such redrawing is necessary.

Blow-moulding is carried out in any known manner at a temperature of the material, which is above the glass transition temperature Tg. Normally, blow-moulding takes place against heated mould walls. In certain illustrative embodiments, a heated elongate blow mandrel is required in order to avoid excessive cooling of the material during the blow-moulding step.

The material oriented by flow possesses improved strength properties in the direction of orienting, which is largely the same as the direction of drawing the material. Since the material has been heated to a temperature above the glass transition temperature Tg, there are no difficulties in a blow-moulding process with regard to reshaping the element by stretching the material in a direction which is mainly at right angles to the said direction of orienting. An element reshaped in this way forms, for example, a container having a central shell surface of a diameter which exceeds the diameter of the opening, and having a bottom which consists of a standing surface which represents the transition between the lower edge of the shell surface and the bottom surface, the bottom surface either being slightly concave or consisting of annular material sections which are displaced relative to one another in the axial direction of the container.

The above description merely represents examples for the application of the invention. The invention allows of course that a number of combinations of drawing steps take place, zones of drawn and undrawn material also forming alternately. For example, the body consists of wall parts with sections which contain undrawn material, whilst the bottom part consists of sections, for example annular sections, which contain undrawn material and which are displaced in the axial direction of the body relative to the lower edge of the wall part.

The concept of the invention comprises many optional embodiments. According to one of these, drawing until the material in the body of the element flows is effected by a number of successive drawing steps, the contact area of the press device decreasing for each drawing step. The result of this is that the width of the material zone 15 is adapted to the extent to which the drawing step has proceeded.

We claim:

1. Apparatus for the manufacture of a cup-like article from polyethylene terephthalate or similar material comprising clamping means for clamping a substantially flat blank of amorphous, polyethylene terephthalate or similar material in a peripheral region thereof to form an inner zone completely surrounded by an outer clamped zone, press means for engaging said inner zone of said blank in a central region thereof smaller than the total area of said inner zone whereby a band-like zone is formed between said outer clamped zone and the central region in contact with said press means, said band-like zone having a radial extent substantially greater than the thickness of said blank, means for effecting relative displacement between said press means and said clamping means, means for maintaining the temperature of said blank below the glass transition temperature (Tg) of the material of the blank, the aforesaid clamping means, press means, relative displacement means and temperature maintaining means cooperatively constituting means for producing free stretching of the material of the blank in a drawing region by forming a transition zone in said material at which flow takes place in the material and the original thickness of the blank is reduced by a factor sufficient to effect orientation and crystallization of the material whereby a drawn element is formed which comprises an edge part composed of said clamped zone and a body which is drawn relative to said edge part and includes the oriented crystallized material, said temperature maintaining means including means in said press means so arraged as to provide for cooling the material of said blank at the temperature below Tg at least in the region of said transition zone to enable the material to be freely stretched thereat without undergoing compressive squeezing between the clamping means and the press means.

2. Apparatus as claimed in claim 1 wherein said press means has an outer surface which progressively comes into contact with said material in the course of drawing thereof, said means for cooling the blank comprising channels in said press means proximate said outer surface for flow of a coolant therein.

3. Apparatus as claimed in claim 1 comprising means for supplying a heat transfer fluid to said clamping means for controlling the temperature of said material in said clamped zone.

4. Apparatus as claimed in claim 3 wherein said heat transfer fluid is a coolant.

5. Apparatus as claimed in claim 3 wherein said means for supplying heat transfer fluid includes a first set of channels for a cooling fluid and a second set of channels for a heating fluid and insulation means separating said first and second set of channels.

6. Apparatus as claimed in claim 5 wherein said first set of channels is located in said clamping means at a location more remote from said press means than is said second set of channels.

7. Apparatus as claimed in claim 6 wherein said heating fluid in said first set of channels is at an elevated temperature below $T_g$ to produce said transition zone within said clamping means.

8. Apparatus as claimed in claim 1 wherein said press means has a flat bottom surface which contacts said blank in said central region thereof.

* * * * *